2,066,142

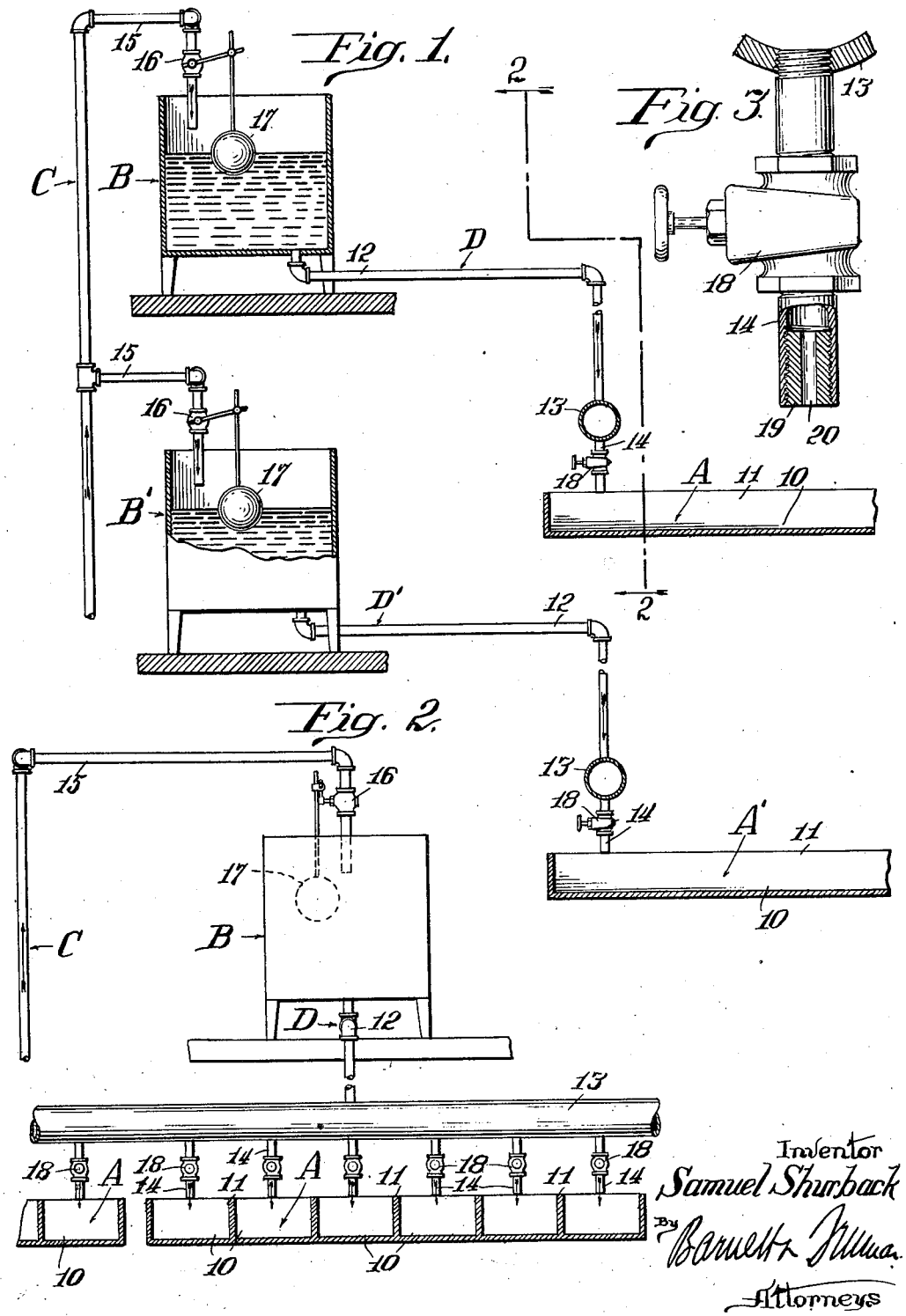
Dec. 29, 1936. S. SHURBACK 2,066,142
FEEDING APPARATUS FOR STARCH TABLES
Filed Aug. 24, 1934
Inventor
Samuel Shurback
By Barnett & Ullman
Attorneys Patented Dec. 29, 1936

UNITED STATES PATENT OFFICE 2,066,142

FEEDING APPARATUS FOR STARCH TABLES

Samuel Shurback, North Kansas City, Mo., assignor to International Patents Development Company, Wilmington, Del., a corporation of Delaware Application August 24, 1934, Serial No. 741,274

4 Claims. (Cl. 127—26)

This invention relates to the tabling of starch and gluten mixtures, in the manufacture of starch from corn, for the purpose of removing the gluten from the starch.

The starch tables consist of long slightly inclined shallow troughs, usually divided into separate channels by longitudinal partitions but open and free from any obstruction at their lower ends. The starch and gluten mixture in suspension in water is delivered to the table heads by means of a transverse header pipe provided with nozzles or feed pipes usually one for each channel of the tables. As the liquid flows over the tables the starch settles while the water, carrying the gluten, flows over the gradually accumulated starch and tails off from the lower ends of the tables. The length and inclination of the tables being fixed, the success of the separation depends upon proper adjustment of the rate at which the starch liquor (starch, gluten and water mixture) is fed to the table heads. Any adjustment in the rate of the feed should take account not only of table lengths and inclinations but of the character of the starch liquor, that is the relative proportions as between the starch, gluten and water; because a rate of flow over the tables which is correct, or the best obtainable, for a starch liquor of a given character will not give the best possible separation—that is the complete separation of the gluten from the starch with a minimum overflow of starch into the gluten settlers—if the proportions as between starch, gluten and water are changed.

In starch factories of any considerable size it has been customary to arrange the tables at different levels, that is on different floors, as putting them all on the same level would involve occupation of too much ground space. This further complicates the distribution problem because of the differences in supply pipe pressures at the different levels.

It was customary for a long time for the operators to attempt to maintain the proper rate of flow over the tables in different parts of the table house and under varying supply pipe pressure and other varying conditions, by manual adjustment of valves in the distributing piping. The difficulty of obtaining a proper distribution in this way, particularly for a large plant, led to the adoption of what has been known as the "cascade system" disclosed in application for United States patent to H. W. Curry, filed May 16, 1932, No. 611,624, (Patent No. 1,977,792, October 23, 1934), according to which a reservoir tank is provided on each floor forming a part of the supply system and having a funnel outlet in the upper part of the tank which is connected by a pipe to the tank below. The same level of liquor is maintained in each tank, and, consequently, the same head of liquor to each set of tables, by having all the outlet funnels the same distance above the tables. The excess of liquor in each tank overflows to the next tank below. This system provides for a uniform rate of flow over all of the tables regardless of a difference in floor level, but in case of a decrease in the supply of the starch liquor, due for example to a slowing up of the mill-house operations, the head of the liquor in the lower floor reservoirs might be considerably reduced, because with this system of operation any deficiency in supply would not be equally proportioned as between the different floors of the building. But a more serious objection, perhaps, is that a certain amount of settling necessarily takes place in the reservoirs with the result that as the liquor moves from the top of the building to the bottom, it becomes progressively more dilute, containing less solids in proportion to water, and will be found to contain more and more gluten in proportion to starch. A rate of flow proper for the upper floors of the table house may not, under these circumstances, give the best results with the differently constituted mixtures at the lower floors.

The present invention seeks to overcome these difficulties (and those inherent in the system used before the "cascade system" was adopted) first by providing the tables on each lever with a reservoir into which the starch liquor is fed through a float controlled valve to reduce to a narrow and fixed range the fluctuations in the head for any one set of tables and as between tables on different levels, due to variations in pressure in the supply system; and second by arranging the reservoirs at substantial elevations above the tables which they respectively supply so as to reduce, to a negligible minimum, the effect of the fluctuations of head on flow over the tables due to the intermittent operation of the float valves.

The invention is illustrated in the accompanying drawing in which Fig. 1 is a fragmentary side elevation with parts in section, illustrating the tables and reservoirs on two adjacent floors;

Fig. 2 is a sectional elevation on line 2—2 of Fig. 1; and

Fig. 3 is a vertical sectional view of the lower end of one of the nozzles.

Referring to the drawing, the starch tables at the upper level are indicated at A and those at the next level below at A'. The reservoirs are designated B and B'; and the common supply pipe designated C. The distributing piping between reservoir B and tables A is indicated at D and the corresponding distributing piping for the tables A' is designated D'.

The starch tables are of the usual construction consisting of wide shallow troughs 10 divided into channels by the longitudinal partitions 11. A pipe 12 leads from each of the reservoirs to a header 13 which extends transversely across the table heads and is provided with a plurality of vertical nozzles 14, one for each channel of the tables.

The supply pipe C is provided with branch pipes 15 leading to the reservoirs. In each of these branch pipes is a valve 16 controlled by a float 17 located in the reservoir which operates to open the valve at a predetermined liquid level in the reservoir and to close the valve at a predetermined higher lever therein. The operation of the float controlled valve 16 is necessarily intermittent. This involves a fluctuation, perhaps of an inch, more or less, in the level of the liquid in the reservoir, assuming a constant pressure in the supply pipe. Under ordinary practice prior to the "cascade" system the fluctuation of level in the reservoir if a reservoir were used might, due to not unusual fluctuations in supply pipe pressure, vary as much perhaps as three inches. In order to minimize the effect of these fluctuations on the rate of feed to the tables the reservoir which supplies the tables on each floor is provided according to the present invention, with a float valve as described and is arranged at a substantial elevation above the tables so that it will provide a mean head of eight feet or more of liquor at the point of discharge to the tables. With a head of this substantial character the effect on flow over the tables of the fluctuations in level in the reservoir due to the intermittent operation of the float valve is minimized and such fluctuations become in fact entirely inconsequential.

The nozzles 14 are provided with valves 18, and the lower end of the nozzles are formed so as to provide a discharge opening smaller than the internal diameter of the nozzle. For example, the lower end of the nozzle has inserted therein a plug 19 formed with a bore 20. If the nozzle is made of a three-fourths inch pipe, the plug may have a thirteen-sixty-fourths inch outlet bore.

By this arrangement when one of the channels of the starch table is ready to receive the starch liquor, the valve 18 in the nozzle arranged above said channel may be opened fully, and the flow in all cases will be uniform.

In the apparatus as shown and described, the starch liquor supplied by the several reservoirs to the tables which they serve respectively is uniform in character, and the flow over the tables is uniform, through maintenance of substantially equal heads in the different reservoirs. Hence, the separation of gluten from starch is carried out with greater uniformity than has been heretofore possible, at least without the constant supervision which is not easy to maintain in large factories.

I claim:

1. In starch tabling apparatus the combination of starch tables consisting of inclined troughs open and free from obstruction at their lower ends; a reservoir for starch liquor; distributing piping leading from the lower part of the reservoir through which the starch liquor is discharged to the table heads; a valve to control the supply of starch liquor to the reservoir; and a float arranged in the reservoir to open said valve at a predetermined liquor level in the reservoir and to close the valve at a predetermined higher liquid level therein for maintaining the starch liquor in the reservoir at levels substantially above the opening from the reservoir into the distributing piping; said reservoir being disposed so as to maintain a head of liquor discharged to the tables sufficient to reduce to a negligible minimum the effect on the rate of flow over the tables of fluctuations in the liquor level in the reservoir, due to the intermittent operation of the float controlled valve.

2. In starch tabling apparatus the combination of starch tables consisting of inclined troughs open and free from obstruction at their lower ends; a reservoir for starch liquor; a supply pipe leading to the reservoir; distributing piping leading from the lower part of the reservoir through which the starch liquor is discharged to the table heads; a valve in the supply piping; and a float arranged in the reservoir to open said valve at a predetermined liquor level in the reservoir and to close the valve when the liquid level exceeds the aforesaid level by about one inch for maintaining the starch liquor in the reservoir at levels substantially above the opening from the reservoir into the distributing piping; said reservoir being disposed so that said liquor levels maintained therein are at an elevation above the tables to maintain a head of liquor to the tables of approximately eight feet, whereby the effect on the rate of flow over the tables of fluctuations in liquor level in the reservoir, due to the intermittent operation of the float controlled valve, is reduced to a negligible minimum.

3. In starch tabling apparatus a plurality of starch tables arranged at different levels consisting of inclined troughs open and free from obstruction at their lower ends; a reservoir for starch liquor for the tables at each level; supply piping leading to the reservoirs, distributing piping leading from the lower parts of the reservoirs through which liquor is discharged to the table heads; a valve in the supply piping for each reservoir; a float arranged in each reservoir to open and close the valve at predetermined lower and higher liquor levels, respectively, in the reservoir for maintaining the starch liquor in the reservoir at levels substantially above the opening from the reservoir into the distributing piping; said reservoirs being disposed so that said liquor levels maintained therein are at substantial elevations above the tables to maintain substantial heads of liquor discharged to the tables, whereby the effect on the rate of flow over the tables of fluctuations in liquor level in the reservoirs, due to the intermittent operation of the float controlled valves is reduced to a negligible minimum.

4. In starch tabling apparatus the combination of a plurality of starch tables at different levels consisting of inclined troughs open and free from obstruction at their lower ends; a reservoir for starch liquor for the tables at each level; a common supply pipe with branches leading to the several reservoirs; distributing piping leading from the lower parts of the reservoirs through which starch liquor is distributed to the table heads; a valve in each of said branch supply pipes; a float arranged in each reservoir to open and close the valve for said reservoir at predetermined lower and higher liquor levels, respectively, in the reservoir for maintaining the starch liquor in the reservoir at levels substantially above the opening from the reservoir into the distributing piping; said reservoirs being disposed so that said liquid levels maintained therein are at equal and substantial elevations above the tables which are supplied by said reservoirs, respectively, to maintain substantial and equal heads of liquor discharged to the tables, whereby the effect on the rate of flow over the tables of fluctuations in the liquor levels in the reservoirs, due to the intermittent operation of the float controlled valves, is reduced to a negligible minimum and the flow over all the tables is kept substantially uniform.

SAMUEL SHURBACK.